(12) United States Patent
Branagan et al.

(10) Patent No.: US 8,658,934 B2
(45) Date of Patent: Feb. 25, 2014

(54) FEEDSTOCK POWDER FOR PRODUCTION OF HIGH HARDNESS OVERLAYS

(75) Inventors: Daniel James Branagan, Idaho Falls, ID (US); Brian D. Merkle, Idaho Falls, ID (US); Brian E. Meacham, Idaho Falls, ID (US); William D. Kiilunen, Rigby, ID (US); David Paratore, Warren, RI (US)

(73) Assignee: The NanoSteel Company, Inc., Providence, RI (US)

( * ) Notice: Subject to any disclaimer, the term of this patent is extended or adjusted under 35 U.S.C. 154(b) by 271 days.

(21) Appl. No.: 12/854,103

(22) Filed: Aug. 10, 2010

(65) Prior Publication Data

US 2011/0031222 A1   Feb. 10, 2011

Related U.S. Application Data

(60) Provisional application No. 61/232,598, filed on Aug. 10, 2009.

(51) Int. Cl.
*B23K 9/04* (2006.01)

(52) U.S. Cl.
USPC ..................... 219/76.14; 219/76.13

(58) Field of Classification Search
USPC .......................... 219/76.14, 76.13
See application file for complete search history.

(56) References Cited

U.S. PATENT DOCUMENTS

| 4,365,997 A | 12/1982 | Jachowski et al. |
| 2004/0250926 A1 | 12/2004 | Branagan |
| 2007/0029295 A1 | 2/2007 | Branagan et al. |
| 2008/0241584 A1 | 10/2008 | Daemen et al. |

OTHER PUBLICATIONS

International Search Report and Written Opinion dated Sep. 30, 2010 issued in related International Patent Application No. PCT/US10/45085.

*Primary Examiner* — Douglas Menz
(74) *Attorney, Agent, or Firm* — Grossman, Tucker, Perreault & Pfleger, PLLC (57) ABSTRACT

A method of applying a metallic alloy overlay including providing an iron based feedstock powder including 10 to 75 weight percent iron and manganese, 10 to 60 weight percent of chromium, 1 to 30 weight percent of an interstitial element selected from boron, carbon, silicon or combinations thereof, 0 to 40 weight percent of a transition metal selected from molybdenum, tungsten or combinations thereof and 1 to 25 weight percent niobium. The method also includes providing an electrode including at least 50 weight percent iron and depositing a weld overlay with the feedstock powder and the electrode to create a metallic alloy exhibiting a grain size in the range of 1,000 μm or less.

14 Claims, 7 Drawing Sheets

FEEDSTOCK POWDER FOR PRODUCTION OF HIGH HARDNESS OVERLAYS

CROSS-REFERENCE TO RELATED APPLICATIONS

This application claims the benefit of the filing date of U.S. Provisional Patent Application Ser. No. 61/232,598, filed on Aug. 10, 2009, which is fully incorporated herein by reference.

FIELD OF INVENTION

The present disclosure relates to iron based feedstock powder which may be combined with conventional solid electrode wires in a welding process such as submerged arc and its variations to form relatively high hardness overlays onto various product forms including plate, pipes, and elbows.

BACKGROUND

Existing weld overlay materials may often be considered macrocomposites, which may be developed by starting with hard particles that may include carbides (e.g., WC, VC, $Cr_3C_2$, $Cr_{23}C_6$, TiC, HfC, etc.), borides (e.g., $TiB_2$, $ZrB_2$, etc.), borocarbides (e.g., $M(BC)_2$, $M(BC)_3$, $M_{23}(BC)_6$, etc.), nitrides (e.g., BN, TiN, AN, etc.), and/or other specific hard phases like diamond, etc. and incorporating the hard particles at various volume fractions (i.e. typically 15 to 65%) into an appropriate binder, which may include a nickel (or nickel alloy) based binder, a cobalt (or cobalt alloy) based binder, or an iron (or iron alloy) based binder. The binder may provide a matrix to hold the hard particles by wetting the particle surface sufficiently so that it may be captured while not completely dissolving. The binder may also provide a measure of toughness/crack resistance to enable the composite to perform adequately in service.

SUMMARY

The present disclosure relates to a method of applying a metallic alloy overlay. The method includes providing an iron based feedstock powder including 10 to 75 weight percent iron and manganese, 10 to 60 weight percent of chromium, 1 to 30 weight percent of an interstitial element selected from boron, carbon, silicon or combinations thereof, 0 to 40 weight percent of a transition metal selected from molybdenum, tungsten or combinations thereof and 1 to 25 weight percent niobium. The method also includes providing an electrode including at least 50 weight percent iron and depositing a weld overlay with the feedstock powder and the electrode to create a metallic alloy exhibiting a grain size in the range of 1,000 μm or less.

BRIEF DESCRIPTION OF DRAWINGS

The above-mentioned and other features of this disclosure, and the manner of attaining them, may become more apparent and better understood by reference to the following description of embodiments described herein taken in conjunction with the accompanying drawings, wherein.

DESCRIPTION

The present disclosure relates to an approach of producing relatively high hardness overlays using metallic alloy chemistries that may be considered inherently glass forming. This differs from the 'macrocomposite' approach identified above where hard particles are incorporated into a binder. An alloy that is inherently glass forming or exhibits glass forming ability may be understood as one that may exhibit an inherent resistance to nucleation and/or subsequent growth during undercooling (i.e., the ability to cool to below the glass transition temperature at a rate sufficient enough to substantially prevent the formation of crystalline gains) of the alloy from the melting point. The alloys may exhibit some degree of nucleation and crystallization upon solidification. However, grain structures, i.e., crystallites including atoms, molecules or ions, arranged in an orderly repeating pattern, present in the alloy may be less than 1000 μm including all values and increments therein, such as less than 1,000 nm, 500 nm, less than 100 nm, less than 50 nm, less than 10 nm.

The level of undercooling for the alloys disclosed herein achieved during welding may depend on a number of factors including the specific welding parameters and the alloys response to the cooling conditions but, in general, the level of undercooling may be upwards of several hundred degrees. Such undercooling may be relatively greater than non-glass forming chemistries that may experience nucleation and subsequent rapid growth only after a few tens of degrees of undercooling. It is contemplated that the ability to achieve relatively high undercooling may result in relatively significant refinement of the resulting microstructure over conventional alloys solidifying with conventional liquid solidification growth modes. Without being limited to any particular theory, the relatively high level of undercooling may be a result of the increased driving forces for nucleation at lower temperatures combined with a reduction in the temperature dependant diffusional processes which limits growth.

Many advantages may arise from the reduction of grain/phases present in the alloy and it is contemplated that such advantages may include relatively higher hardness, better fine particle and erosion resistance as shown by the Rockwell C hardness testing and dry sand rubber wheel abrasion testing, and an increase in weld overlay toughness as fewer stress concentrations may occur in individual hard phases and any cracks produced may be arrested and/or bridged in the more ductile matrix phases. The inherently glass forming metallic alloys disclosed herein may be formed using a feedstock powder in combination with an iron based wire electrode or other iron based electrode, which may be cored or solid. The feedstock powder and the electrode may be combined during or prior to welding to provide the inherently glass forming metallic alloy as an overlay.

The feedstock powder may include 10 to 75 wt % (weight percent) of a base metal, including iron and manganese; 10 to 60 wt % of chromium; 1 to 30 wt % of an interstitial element selected from boron, carbon, silicon or combinations thereof; 0 to 40 wt % of a transition metal selected from molybdenum, tungsten, or combinations thereof; and 1 to 25 wt % of niobium. In other examples, the glass forming feedstock powder may include 18 to 67 wt % of a base metal including iron and manganese; 19 to 54 wt % of chromium; 6 to 21 wt % of interstitial elements selected from boron, carbon, silicon or combinations thereof; 0 to 25 wt % of a transition metal selected from molybdenum, tungsten or combinations thereof; and 1 to 15 wt % niobium.

For example, the feedstock powder may include 22.6 wt % to 62.5 wt % of iron, 0.1 wt % to 5.0 wt % of manganese, 23.1 to 49.4 wt % of chromium, 6.8 to 12.8 wt % of boron, 1.9 to 3.6 wt % of carbon, 0.5 to 0.9 wt % of silicon, 5.0 to 12.8 wt % of niobium, optionally 7.5 to 7.6 wt % molybdenum and optionally 14.2 wt % tungsten. The elements, i.e., iron, manganese, etc., may be present at all values therein, at 0.1 wt % increments. For example, iron may be present at 22.6 wt %, 22.7 wt %, 22.8 wt %, 22.9 wt %, 23.0 wt %, 23.1 wt %, 23.2 wt %, 23.3 wt %, 23.4 wt %, 23.5 wt %, 23.6 wt %, 23.7 wt %, 23.8 wt %, 23.9 wt %, 24.0 wt %, 24.1 wt %, 24.2 wt %, 24.3 wt %, 24.4 wt %, 24.5 wt %, 24.6 wt %, 24.7 wt %, 24.8 wt %, 24.9 wt %, 25.0 wt %, 25.1 wt %, 25.2 wt %, 25.3 wt %, 25.4 wt %, 25.5 wt %, 25.6 wt %, 25.7 wt %, 25.8 wt %, 25.9 wt %, 26.0 wt %, 26.1 wt %, 26.2 wt %, 26.3 wt %, 26.4 wt %, 26.5 wt %, 26.6 wt %, 26.7 wt %, 26.8 wt %, 26.9 wt %, 27.0 wt %, 27.1 wt %, 27.2 wt %, 27.3 wt %, 27.4 wt %, 27.5 wt %, 27.6 wt %, 27.7 wt %, 27.8 wt %, 27.9 wt %, 28.0 wt %, 28.1 wt %, 28.2 wt %, 28.3 wt %, 28.4 wt %, 28.5 wt %, 28.6 wt %, 28.7 wt %, 28.8 wt %, 28.9 wt %, 29.0 wt %, 29.1 wt %, 29.2 wt %, 29.3 wt %, 29.4 wt %, 29.5 wt %, 29.6 wt %, 29.7 wt %, 29.8 wt %, 29.9 wt %, 30.0 wt %, 30.1 wt %, 30.2 wt %, 30.3 wt %, 30.4 wt %, 30.5 wt %, 30.6 wt %, 30.7 wt %, 30.8 wt %, 30.9 wt %, 31.0 wt %, 31.1 wt %, 31.2 wt %, 31.3 wt %, 31.4 wt %, 31.5 wt %, 31.6 wt %, 31.7 wt %, 31.8 wt %, 31.9 wt %, 32.0 wt %, 32.1 wt %, 32.2 wt %, 32.3 wt %, 32.4 wt %, 32.5 wt %, 32.6 wt %, 32.7 wt %, 32.8 wt %, 32.9 wt %, 33.0 wt %, 33.1 wt %, 33.2 wt %, 33.3 wt %, 33.4 wt %, 33.5 wt %, 33.6 wt %, 33.7 wt %, 33.8 wt %, 33.9 wt %, 34.0 wt %, 34.1 wt %, 34.2 wt %, 34.3 wt %, 34.4 wt %, 34.5 wt %, 34.6 wt %, 34.7 wt %, 34.8 wt %, 34.9 wt %, 35.0 wt %, 35.1 wt %, 35.2 wt %, 35.3 wt %, 35.4 wt %, 35.5 wt %, 35.6 wt %, 35.7 wt %, 35.8 wt %, 35.9 wt %, 36.0 wt %, 36.1 wt %, 36.2 wt %, 36.3 wt %, 36.4 wt %, 36.5 wt %, 36.6 wt %, 36.7 wt %, 36.8 wt %, 36.9 wt %, 37.0 wt %, 37.1 wt %, 37.2 wt %, 37.3 wt %, 37.4 wt %, 37.5 wt %, 37.6 wt %, 37.7 wt %, 37.8 wt %, 37.9 wt %, 38.0 wt %, 38.1 wt %, 38.2 wt %, 38.3 wt %, 38.4 wt %, 38.5 wt %, 38.6 wt %, 38.7 wt %, 38.8 wt %, 38.9 wt %, 39.0 wt %, 39.1 wt %, 39.2 wt %, 39.3 wt %, 39.4 wt %, 39.5 wt %, 39.6 wt %, 39.7 wt %, 39.8 wt %, 39.9 wt %, 40.0 wt %, 40.1 wt %, 40.2 wt %, 40.3 wt %, 40.4 wt %, 40.5 wt %, 40.6 wt %, 40.7 wt %, 40.8 wt %, 40.9 wt %, 41.0 wt %, 41.1 wt %, 41.2 wt %, 41.3 wt %, 41.4 wt %, 41.5 wt %, 41.6 wt %, 41.7 wt %, 41.8 wt %, 41.9 wt %, 42.0 wt %, 42.1 wt %, 42.2 wt %, 42.3 wt %, 42.4 wt %, 42.5 wt %, 42.6 wt %, 42.7 wt %, 42.8 wt %, 42.9 wt %, 43.0 wt %, 43.1 wt %, 43.2 wt %, 43.3 wt %, 43.4 wt %, 43.5 wt %, 43.6 wt %, 43.7 wt %, 43.8 wt %, 43.9 wt %, 44.0 wt %, 44.1 wt %, 44.2 wt %, 44.3 wt %, 44.4 wt %, 44.5 wt %, 44.6 wt %, 44.7 wt %, 44.8 wt %, 44.9 wt %, 45.0 wt %, 45.1 wt %, 45.2 wt %, 45.3 wt %, 45.4 wt %, 45.5 wt %, 45.6 wt %, 45.7 wt %, 45.8 wt %, 45.9 wt %, 46.0 wt %, 46.1 wt %, 46.2 wt %, 46.3 wt %, 46.4 wt %, 46.5 wt %, 46.6 wt %, 46.7 wt %, 46.8 wt %, 46.9 wt %, 47.0 wt %, 47.1 wt %, 47.2 wt %, 47.3 wt %, 47.4 wt %, 47.5 wt %, 47.6 wt %, 47.7 wt %, 47.8 wt %, 47.9 wt %, 48.0 wt %, 48.1 wt %, 48.2 wt %, 48.3 wt %, 48.4 wt %, 48.5 wt %, 48.6 wt %, 48.7 wt %, 48.8 wt %, 48.9 wt %, 49.0 wt %, 49.1 wt %, 49.2 wt %, 49.3 wt %, 49.4 wt %, 49.5 wt %, 49.6 wt %, 49.7 wt %, 49.8 wt %, 49.9 wt %, 50.0 wt %, 50.1 wt %, 50.2 wt %, 50.3 wt %, 50.4 wt %, 50.5 wt %, 50.6 wt %, 50.7 wt %, 50.8 wt %, 50.9 wt %, 51.0 wt %, 51.1 wt %, 51.2 wt %, 51.3 wt %, 51.4 wt %, 51.5 wt %, 51.6 wt %, 51.7 wt %, 51.8 wt %, 51.9 wt %, 52.0 wt %, 52.1 wt %, 52.2 wt %, 52.3 wt %, 52.4 wt %, 52.5 wt %, 52.6 wt %, 52.7 wt %, 52.8 wt %, 52.9 wt %, 53.0 wt %, 53.1 wt %, 53.2 wt %, 53.3 wt %, 53.4 wt %, 53.5 wt %, 53.6 wt %, 53.7 wt %, 53.8 wt %, 53.9 wt %, 54.0 wt %, 54.1 wt %, 54.2 wt %, 54.3 wt %, 54.4 wt %, 54.5 wt %, 54.6 wt %, 54.7 wt %, 54.8 wt %, 54.9 wt %, 55.0 wt %, 55.1 wt %, 55.2 wt %, 55.3 wt %, 55.4 wt %, 55.5 wt %, 55.6 wt %, 55.7 wt %, 55.8 wt %, 55.9 wt %, 56.0 wt %, 56.1 wt %, 56.2 wt %, 56.3 wt %, 56.4 wt %, 56.5 wt %, 56.6 wt %, 56.7 wt %, 56.8 wt %, 56.9 wt %, 57.0 wt %, 57.1 wt %, 57.2 wt %, 57.3 wt %, 57.4 wt %, 57.5 wt %, 57.6 wt %, 57.7 wt %, 57.8 wt %, 57.9 wt %, 58.0 wt %, 58.1 wt %, 58.2 wt %, 58.3 wt %, 58.4 wt %, 58.5 wt %, 58.6 wt %, 58.7 wt %, 58.8 wt %, 58.9 wt %, 59.0 wt %, 59.1 wt %, 59.2 wt %, 59.3 wt %, 59.4 wt %, 59.5 wt %, 59.6 wt %, 59.7 wt %, 59.8 wt %, 59.9 wt %, 60.0 wt %, 60.1 wt %, 60.2 wt %, 60.3 wt %, 60.4 wt %, 60.5 wt %, 60.6 wt %, 60.7 wt %, 60.8 wt %, 60.9 wt %, 61.0 wt %, 61.1 wt %, 61.2 wt %, 61.3 wt %, 61.4 wt %, 61.5 wt %, 61.6 wt %, 61.7 wt %, 61.8 wt %, 61.9 wt %, 62.0 wt %, 62.1 wt %, 62.2 wt %, 62.3 wt %, 62.4 wt %, 62.5 wt %. Manganese may be present at 0.1 wt %, 0.2 wt %, 0.3 wt %, 0.4 wt %, 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, 1.6 wt %, 1.7 wt %, 1.8 wt %, 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %, 3.7 wt %, 3.8 wt %, 3.9 wt %, 4.0 wt %, 4.1 wt %, 4.2 wt %, 4.3 wt %, 4.4 wt %, 4.5 wt %, 4.6 wt %, 4.7 wt %, 4.8 wt %, 4.9 wt %, 5.0 wt %. Chromium may be present at 23.1 wt %, 23.2 wt %, 23.3 wt %, 23.4 wt %, 23.5 wt %, 23.6 wt %, 23.7 wt %, 23.8 wt %, 23.9 wt %, 24.0 wt %, 24.1 wt %, 24.2 wt %, 24.3 wt %, 24.4 wt %, 24.5 wt %, 24.6 wt %, 24.7 wt %, 24.8 wt %, 24.9 wt %, 25.0 wt %, 25.1 wt %, 25.2 wt %, 25.3 wt %, 25.4 wt %, 25.5 wt %, 25.6 wt %, 25.7 wt %, 25.8 wt %, 25.9 wt %, 26.0 wt %, 26.1 wt %, 26.2 wt %, 26.3 wt %, 26.4 wt %, 26.5 wt %, 26.6 wt %, 26.7 wt %, 26.8 wt %, 26.9 wt %, 27.0 wt %, 27.1 wt %, 27.2 wt %, 27.3 wt %, 27.4 wt %, 27.5 wt %, 27.6 wt %, 27.7 wt %, 27.8 wt %, 27.9 wt %, 28.0 wt %, 28.1 wt %, 28.2 wt %, 28.3 wt %, 28.4 wt %, 28.5 wt %, 28.6 wt %, 28.7 wt %, 28.8 wt %, 28.9 wt %, 29.0 wt %, 29.1 wt %, 29.2 wt %, 29.3 wt %, 29.4 wt %, 29.5 wt %, 29.6 wt %, 29.7 wt %, 29.8 wt %, 29.9 wt %, 30.0 wt %, 30.1 wt %, 30.2 wt %, 30.3 wt %, 30.4 wt %, 30.5 wt %, 30.6 wt %, 30.7 wt %, 30.8 wt %, 30.9 wt %, 31.0 wt %, 31.1 wt %, 31.2 wt %, 31.3 wt %, 31.4 wt %, 31.5 wt %, 31.6 wt %, 31.7 wt %, 31.8 wt %, 31.9 wt %, 32.0 wt %, 32.1 wt %, 32.2 wt %, 32.3 wt %, 32.4 wt %, 32.5 wt %, 32.6 wt %, 32.7 wt %, 32.8 wt %, 32.9 wt %, 33.0 wt %, 33.1 wt %, 33.2 wt %, 33.3 wt %, 33.4 wt %, 33.5 wt %, 33.6 wt %, 33.7 wt %, 33.8 wt %, 33.9 wt %, 34.0 wt %, 34.1 wt %, 34.2 wt %, 34.3 wt %, 34.4 wt %, 34.5 wt %, 34.6 wt %, 34.7 wt %, 34.8 wt %, 34.9 wt %, 35.0 wt %, 35.1 wt %, 35.2 wt %, 35.3 wt %, 35.4 wt %, 35.5 wt %, 35.6 wt %, 35.7 wt %, 35.8 wt %, 35.9 wt %, 36.0 wt %, 36.1 wt %, 36.2 wt %, 36.3 wt %, 36.4 wt %, 36.5 wt %, 36.6 wt %, 36.7 wt %, 36.8 wt %, 36.9 wt %, 37.0 wt %, 37.1 wt %, 37.2 wt %, 37.3 wt %, 37.4 wt %, 37.5 wt %, 37.6 wt %, 37.7 wt %, 37.8 wt %, 37.9 wt %, 38.0 wt %, 38.1 wt %, 38.2 wt %, 38.3 wt %, 38.4 wt %, 38.5 wt %, 38.6 wt %, 38.7 wt %, 38.8 wt %, 38.9 wt %, 39.0 wt %, 39.1 wt %, 39.2 wt %, 39.3 wt %, 39.4 wt %, 39.5 wt %, 39.6 wt %, 39.7 wt %, 39.8 wt %, 39.9 wt %, 40.0 wt %, 40.1 wt %, 40.2 wt %, 40.3 wt %, 40.4 wt %, 40.5 wt %, 40.6 wt %, 40.7 wt %, 40.8 wt %, 40.9 wt %, 41.0 wt %, 41.1 wt %, 41.2 wt %, 41.3 wt %, 41.4 wt %, 41.5 wt %, 41.6 wt %, 41.7 wt %, 41.8 wt %, 41.9 wt %, 42.0 wt %, 42.1 wt %, 42.2 wt %, 42.3 wt %, 42.4 wt %, 42.5 wt %, 42.6 wt %, 42.7 wt %, 42.8 wt %, 42.9 wt %, 43.0 wt %, 43.1 wt %, 43.2 wt %, 43.3 wt %, 43.4 wt %, 43.5 wt %, 43.6 wt %, 43.7 wt %, 43.8 wt %, 43.9 wt %, 44.0 wt %, 44.1 wt %, 44.2 wt %, 44.3 wt %, 44.4 wt %, 44.5 wt %, 44.6 wt %, 44.7 wt %, 44.8 wt %, 44.9 wt %, 45.0 wt %, 45.1 wt %, 45.2 wt %, 45.3 wt %, 45.4 wt %, 45.5 wt %, 45.6 wt %, 45.7 wt %, 45.8 wt %, 45.9 wt %, 46.0 wt %, 46.1 wt %, 46.2 wt %, 46.3 wt %, 46.4 wt %, 46.5 wt %, 46.6 wt %, 46.7 wt %, 46.8 wt %, 46.9 wt %, 47.0 wt %, 47.1 wt %, 47.2 wt %, 47.3 wt %, 47.4 wt %, 47.5 wt %, 47.6 wt %, 47.7 wt %, 47.8 wt %, 47.9 wt %, 48.0 wt %, 48.1 wt %, 48.2 wt %, 48.3 wt %, 48.4 wt %, 48.5 wt %, 48.6 wt %, 48.7 wt %, 48.8 wt %, 48.9 wt %, 49.0 wt %, 49.1 wt %, 49.2 wt %, 49.3 wt %, 49.4 wt %. Boron may be present at 6.8 wt %, 6.9 wt %, 7.0 wt %, 7.1 wt %, 7.2 wt %, 7.3 wt %, 7.4 wt %, 7.5 wt %, 7.6 wt %, 7.7 wt %, 7.8 wt %, 7.9 wt %, 8.0 wt %, 8.1 wt %, 8.2 wt %, 8.3 wt %, 8.4 wt %, 8.5 wt %, 8.6 wt %, 8.7 wt %, 8.8 wt %, 8.9 wt %, 9.0 wt %, 9.1 wt %, 9.2 wt %, 9.3 wt %, 9.4 wt %, 9.5 wt %, 9.6 wt %, 9.7 wt %, 9.8 wt %, 9.9 wt %, 10.0 wt %, 10.1 wt %, 10.2 wt %, 10.3 wt %, 10.4 wt %, 10.5 wt %, 10.6 wt %, 10.7 wt %, 10.8 wt %, 10.9 wt %, 11.0 wt %, 11.1 wt %, 11.2 wt %, 11.3 wt %, 11.4 wt %, 11.5 wt %, 11.6 wt %, 11.7 wt %, 11.8 wt %, 11.9 wt %, 12.0 wt %, 12.1 wt %, 12.2 wt %, 12.3 wt %, 12.4 wt %, 12.5 wt %, 12.6 wt %, 12.7 wt %, 12.8 wt %. Carbon may be present at 1.9 wt %, 2.0 wt %, 2.1 wt %, 2.2 wt %, 2.3 wt %, 2.4 wt %, 2.5 wt %, 2.6 wt %, 2.7 wt %, 2.8 wt %, 2.9 wt %, 3.0 wt %, 3.1 wt %, 3.2 wt %, 3.3 wt %, 3.4 wt %, 3.5 wt %, 3.6 wt %. Silicon may be present at 0.5 wt %, 0.6 wt %, 0.7 wt %, 0.8 wt %, 0.9 wt %. Niobium may be present at 5.1 wt %, 5.2 wt %, 5.3 wt %, 5.4 wt %, 5.5 wt %, 5.6 wt %, 5.7 wt %, 5.8 wt %, 5.9 wt %, 6.0 wt %, 6.1 wt %, 6.2 wt %, 6.3 wt %, 6.4 wt %, 6.5 wt %, 6.6 wt %, 6.7 wt %, 6.8 wt %, 6.9 wt %, 7.0 wt %, 7.1 wt %, 7.2 wt %, 7.3 wt %, 7.4 wt %, 7.5 wt %, 7.6 wt %, 7.7 wt %, 7.8 wt %, 7.9 wt %, 8.0 wt %, 8.1 wt %, 8.2 wt %, 8.3 wt %, 8.4 wt %, 8.5 wt %, 8.6 wt %, 8.7 wt %, 8.8 wt %, 8.9 wt %, 9.0 wt %, 9.1 wt %, 9.2 wt %, 9.3 wt %, 9.4 wt %, 9.5 wt %, 9.6 wt %, 9.7 wt %, 9.8 wt %, 9.9 wt %, 10.0 wt %, 10.1 wt %, 10.2 wt %, 10.3 wt %, 10.4 wt %, 10.5 wt %, 10.6 wt %, 10.7 wt %, 10.8 wt %, 10.9 wt %, 11.0 wt %, 11.1 wt %, 11.2 wt %, 11.3 wt %, 11.4 wt %, 11.5 wt %, 11.6 wt %, 11.7 wt %, 11.8 wt %, 11.9 wt %, 12.0 wt %, 12.1 wt %, 12.2 wt %, 12.3 wt %, 12.4 wt %, 12.5 wt %, 12.6 wt %, 12.7 wt %, 12.8 wt %. Molybdenum may optionally be present at 7.5 wt % or 7.6 wt %. Tungsten may optionally be present at 14.2 wt %. In further examples, the feedstock powder may include 20 to 26 wt % of a base metal, including iron and manganese; 25 to 55 wt % of chromium; 8 to 16 wt % of an interstitial element selected from boron, carbon, silicon or combinations thereof; 20 to 30 wt % of a transition metal selected from molybdenum, tungsten, or combinations thereof; and 8 to 14 wt % of niobium. In yet further examples, the alloys may include 20 to 26 wt % of a base metal, including iron and manganese; 25 to 55 wt % of chromium; 8 to 16 wt % of an interstitial element selected from boron, carbon, silicon or combinations thereof; 6 to 9 wt % of a transition metal selected from molybdenum, tungsten, or combinations thereof; and 8 to 14 wt % of niobium. In additional examples, the alloys may include 35 to 65 wt % of a base metal, including iron and manganese; 22 to 52 wt % of chromium; 8 to 13 wt % of an interstitial element selected from boron, carbon, silicon or combinations thereof; and 4 to 7 wt % of niobium.

In some examples, the above formulations may include manganese present in the range of 0.01 to 0.5 wt % of the alloy chemistries, including all values and increments therein. Additionally, the manganese content can be present from 0.01 weight percent or greater, up to the allowable level of impurities. Furthermore, boron may be present in the range of 0 to 15 wt %, carbon in the range of 0 to 5 wt % and silicon in the range of 0.1 to 1.0 wt %, including all values and increments therein. Furthermore, molybdenum may be present in the range of 0 to 8 wt % and tungsten may be present in the range of 0 to 15 wt %, including all values and increments therein. In other examples, boron may be present in the range of 6.0 to 13 wt %, carbon may be present in the range of 1.0 to 4.0 wt % and/or silicon may be present in the range of 0.5 to 1.0 wt %. Molybdenum may be present in the range of 7 to 8 wt % and/or tungsten may be present in the range of 14 wt % to 15 wt %. The alloying elements or compositions may be present up to a total of 100 wt %. Specific examples may include $Fe_{24.3}Mn_{0.1}Cr_{29.5}Mo_{7.6}W_{14.2}B_{8.2}C_{2.4}Si_{0.9}Nb_{12.8}$; $Fe_{23.4}Mn_{0.1}Cr_{44.7}Mo_{7.5}B_{11.4}C_{3.2}Si_{0.7}Nb_{9.0}$; $Fe_{22.6}Mn_{0.1}Cr_{49.4}B_{12.8}C_{3.6}Si_{0.7}Nb_{10.8}$; $Fe_{39.5}Mn_{0.1}Cr_{43.2}B_{8.2}C_{2.3}Si_{0.6}Nb_{6.1}$; $Fe_{54.6}Mn_{0.2}Cr_{27.9}B_{8.1}C_{2.5}Si_{0.6}Nb_{6.1}$; and $Fe_{62.5}Mn_{0.2}Cr_{23.1}B_{6.8}C_{1.9}Si_{0.5}Nb_{5.0}$.

Thus, the feedstock compositions may include, may be limited to, or may consist essentially of the above name elemental components of iron, manganese, chromium, boron, carbon, silicon, niobium and, in some examples, molybdenum and tungsten. Impurities may be present at 5.0 wt % or less, such as 1.0 wt % or less, etc. Impurities may be understood as elements or compositions that may be included in the alloys due to inclusion in the feedstock components, through introduction in the processing equipment, or by reaction of the alloy compositions with the environment.

The feedstock powder may be formed from multiple feedstocks blended together (i.e., multiple powders) or may include a composition of the above alloys in a single powder. In addition, the feedstock powder may have a particle size ranging from 1 μm to 500 μm, including all values and therein at 1 μm increments. It may be appreciated that the feedstock powders themselves may not be glass forming, but when combined with, for example, an iron based electrode, discussed further herein, the resulting alloys may include glass forming chemistries.

The feedstock powder may be combined with an iron based electrode prior to or during welding of the powder and electrode onto a substrate. The electrode may be a wire electrode or a stick electrode. The electrode may also be solid or cored. The iron based electrode may include at least 50 wt % of iron. For example, the iron based electrode may include in the range of 50 to 99.95 wt % iron, including all values therein at 0.01 wt % increments. In some embodiments, the iron based electrode may include steel, such as carbon steel, low-carbon steel, medium-carbon steel, low alloy steels, stainless steel, etc. In some examples, the iron based electrode may include by weight percent (wt %) carbon present in the range of 0.05 to 0.15 wt %, manganese present in the range of 0.80 to 1.25 wt %, silicon present in the range of 0.10 to 0.35 wt %, phosphorous present at 0.03 wt % or less, copper present at 0.35 wt % or less, sulfur present at 0.03 wt % or less and a total of any further components at 0.50 wt % or less, the balance being iron. In a further embodiment, the electrode may include by weight percent (wt %) up to and including 0.08 wt % carbon, 0.25 to 0.60 wt % manganese, up to and including 0.04 wt % phosphorus, up to and including 0.05 wt % sulfur, the balance being iron. For example, carbon may be present at 0.05 wt %, 0.06 wt %, 0.07 wt %, 0.08 wt %, 0.09 wt %, 0.10 wt %, 0.11 wt %, 0.12 wt %, 0.13 wt %, 0.14 wt %, 0.15 wt %. Manganese may be present in the range of 0.80 wt %, 0.81 wt %, 0.82 wt %, 0.83 wt %, 0.84 wt %, 0.85 wt %, 0.86 wt %, 0.87 wt %, 0.88 wt %, 0.89 wt %, 0.90 wt %, 0.91 wt %, 0.92 wt %, 0.93 wt %, 0.94 wt %, 0.95 wt %, 0.96 wt %, 0.97 wt %, 0.98 wt %, 0.99 wt %, 1.00 wt %, 1.01 wt %, 1.02 wt %, 1.03 wt %, 1.04 wt %, 1.05 wt %, 1.06 wt %, 1.07 wt %, 1.08 wt %, 1.09 wt %, 1.10 wt %, 1.11 wt %, 1.12 wt %, 1.13 wt %, 1.14 wt %, 1.15 wt %, 1.16 wt %, 1.17 wt %, 1.18 wt %, 1.19 wt %, 1.20 wt %, 1.21 wt %, 1.22 wt %, 1.23 wt %, 1.24 wt %, 1.25 wt %. Silicon may be present in the range of 0.10 wt %, 0.11 wt %, 0.12 wt %, 0.13 wt %, 0.14 wt %, 0.15 wt %, 0.16 wt %, 0.17 wt %, 0.18 wt %, 0.19 wt %, 0.20 wt %, 0.21 wt %, 0.22 wt %, 0.23 wt %, 0.24 wt %, 0.25 wt %, 0.26 wt %, 0.27 wt %, 0.28 wt %, 0.29 wt %, 0.30 wt %, 0.31 wt %, 0.32 wt %, 0.33 wt %, 0.34 wt %, 0.35 wt %. Phosphorous may be present at 0.01 wt %, 0.02 wt %, 0.03 wt %. Copper may be present at 0.01 wt %, 0.02 wt %, 0.03 wt %, 0.04 wt %, 0.05 wt %, 0.06 wt %, 0.07 wt %, 0.08 wt %, 0.09 wt %, 0.10 wt %, 0.11 wt %, 0.12 wt %, 0.13 wt %, 0.14 wt %, 0.15 wt %, 0.16 wt %, 0.17 wt %, 0.18 wt %, 0.19 wt %, 0.20 wt %, 0.21 wt %, 0.22 wt %, 0.23 wt %, 0.24 wt %, 0.25 wt %, 0.26 wt %, 0.27 wt %, 0.28 wt %, 0.29 wt %, 0.30 wt %, 0.31 wt %, 0.32 wt %, 0.33 wt %, 0.34 wt %, 0.35 wt %. In one embodiment, the electrode may be an EM12K electrode, such as an EM12K wire electrode. The iron based steel wire or electrode may have a diameter in the range of 1 millimeter to 5 millimeters, including all values and increments therein.

The powder to electrode feed ratios may be in the range of 0.2:1 to 5:1 by weight, including all values and increments therein, such as 0.73:1, 1:1, 1.1:1, 1.2:1, 1.85:1, etc. The feedstock powder may be present at levels of 16.0 wt % or greater and up to 84.0 wt %, including all values therein at 0.1 wt % increments. The combined feedstock powder and iron based electrode may exhibit a critical cooling rate which is less than 100,000 K/s, including all values and increments in the range of 100 K/s to 100,000 K/s, such as 1,000 K/s to 10,000 K/s, 500 K/s to 1,500 K/s, etc.

Various forms of welding may be used to deposit the feedstock and iron based electrode onto the substrate, including, for example, submerged arc welding (SAW), open arc welding, GMAW (gas metal arc welding), etc. While forming the weld overlay, the feedstock and iron based electrode chemistries are blended or mixed to form a metallic alloy, which may be inherently glass forming, exhibiting grain sizes of less than 1,000 μm. Upon cooling of the metallic alloy, borocarbide phases may form as described further below.

The substrate may include, for example, a wear plate, a pipe (including internal and/or external surfaces), as well as joints or elbows (including internal and/or external surfaces.) The substrates may also be formed of, for example steel, including carbon steel, low-carbon steel, medium-carbon steel, low alloy steels, stainless steel, etc. It may be appreciated that the feedstock powder and iron based steel wire or electrode may be welded in a relatively continuous fashion forming a protective surface on the substrate to which it is applied.

In some examples, the feedstock powder and iron based electrode may be deposited onto a surface at a thickness in the range of 1 millimeter to 10 millimeters, including all values therein at 1 millimeter increments. In addition, multiple layers of the feedstock powder and iron based electrode may be deposited on a surface, creating a total thickness in the range of 6 millimeters to 26 millimeters, including all values and increments therein.

The overlay alloy including the feedstock powder and iron based electrode may exhibit glass to crystallization peak temperatures from 500° C. to 750° C., including all values and increments therein such as 560° C. to 680° C., when measured by DSC at a heating rate of 10° C./min. In addition, the feedstock powder and iron based steel wire or electrode may exhibit glass to crystallization onset temperatures in the range of 550° C. to 680° C., including all values and increments therein, when measured by DSC at a heating rate of 10° C./min.

The metallic overlay alloy including the feedstock powder combined with the iron based electrode welded onto a substrate may attain single pass overlay hardness greater than Rc 55. For example, it is contemplated that the overlay hardness may be in the range of 55 to 75, including all values and increments therein. In addition, the feedstock powder combined with an iron based electrode may exhibit a double pass overlay hardness of greater than Rc 55. For example, it is contemplated that the double pass overlay hardness may be in the range of 55 to 75, including all values and increments therein.

The feedstock powder combined with the iron based electrode and welded onto a substrate may also attain a low stress abrasion resistance less than 0.20 g mass loss when measured using ASTM G-65 Procedure A for both single and double pass. For example, the low stress abrasion resistance may be in the range of 0.07 grams to 0.20 grams mass loss for single and double pass, including all values and increments therein.

Furthermore, the feedstock powder combined with the iron based electrode welded onto a substrate may result in an as-solidified metallic alloy microstructure with a range of borocarbide phases. Such borocarbide phases may include, for example, $M_1(BC)_1$, $M_2(BC)_1$, $M_3(BC)_1$. In addition, the borocarbide phases may exhibit a largest linear dimension (widths or diameter) less than 1000 μm. For example, the borocarbide phases may be in the range of 0.5 μm to 1000 μm, including all values and increments therein.

EXAMPLES

The examples presented herein are for the purposes of illustration and are not meant to be construed to limit the scope of the disclosure herein.

Alloy Chemistries

To produce high hardness weld overlays using a feedstock powder, a wide range of iron based powders may be used, which when combined with conventional iron based electrodes may result in glass forming liquid melts. While not intending to limit this application, examples of powder chemistries are shown in Table 1. While the powders themselves are not expected to be inherently glass forming, when combined with an iron based electrode to achieve a blended melt chemistry, the alloys may exhibit glass forming tendencies.

TABLE 1

Summary of Submerged Arc Powder Chemistries

| Alloy | Fe | Mn | Cr | Mo | W | B | C | Si | Nb |
|---|---|---|---|---|---|---|---|---|---|
| ALLOY 1 | 24.3 | 0.1 | 29.5 | 7.6 | 14.2 | 8.2 | 2.4 | 0.9 | 12.8 |
| ALLOY 2 | 23.4 | 0.1 | 44.7 | 7.5 | — | 11.4 | 3.2 | 0.7 | 9.0 |
| ALLOY 3 | 22.6 | 0.1 | 49.4 | — | — | 12.8 | 3.6 | 0.7 | 10.8 |
| ALLOY 4 | 39.5 | 0.1 | 43.2 | — | — | 8.2 | 2.3 | 0.6 | 6.1 |
| ALLOY 5 | 54.6 | 0.2 | 27.9 | — | — | 8.1 | 2.5 | 0.6 | 6.1 |
| ALLOY 6 | 62.5 | 0.2 | 23.1 | — | — | 6.8 | 1.9 | 0.5 | 5.0 |

Differential Thermal Analysis

Figure 1:
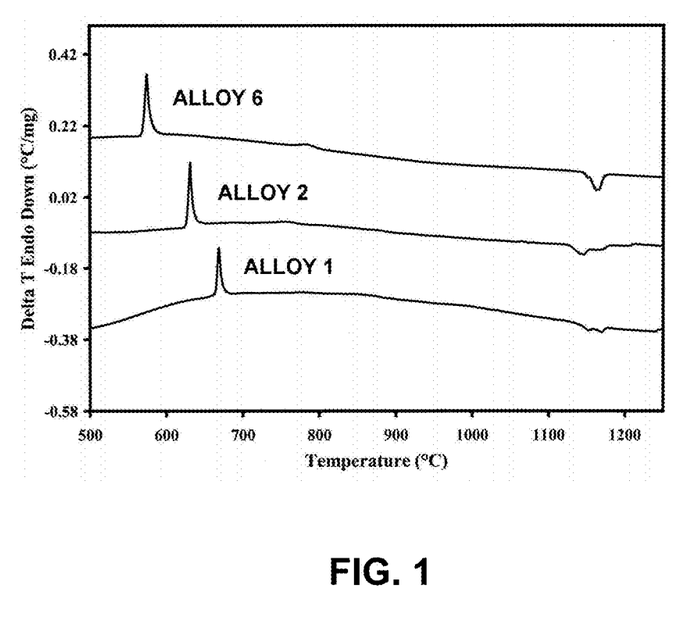
FIG. 1 illustrates DTA scans showing scans of the ALLOY 6, ALLOY 2, and ALLOY 1 powders when combined with an iron electrode to form a base chemistry very similar to the submerged-arc weld overlay deposits.

Differential thermal analysis scans are shown of the ALLOY 1, ALLOY 2, and ALLOY 6 alloys combined with an iron electrode (EM12K) in FIG. 1. Alloy 1 was combined with iron (i.e. EM12K) to simulate a welding chemistry with a powder to wire ratio of 1.25, Alloy 2 was combined with iron (i.e. EM12K) to simulate a welding chemistry with a powder to wire ratio of 0.73, and Alloy 6 was combined with iron (i.e. EM12K) to simulate a welding chemistry with a powder to wire ratio of 1.85. The characteristics of the alloys that are formed are shown from the differential scanning calorimetry (DSC) data shown in Table 2. As shown, the glass to crystallization peak occurs from 575 to 669° C. depending on chemistry and with relatively high enthalpies of transformation from −90.1 to −124.5 J/g.

TABLE 2

DSC Data for Glass to Crystalline Transformations

| Alloy | Peak #1 Onset (° C.) | Peak #1 Peak (° C.) | ΔH (−J/g) |
|---|---|---|---|
| ALLOY 1 | 665 | 669 | 90.1 |
| ALLOY 2 | 626 | 631 | 124.5 |
| ALLOY 6 | 569 | 575 | 97.7 |

Weld Overlay Hardness

The powder chemistries listed in Table 1 were welded into a continuous overlay in a submerged arc-process using a plain carbon steel wire electrode (EM12K) under a relatively thick layer of flux, (ESAB 10.72 neutral, bonded aluminate-basic flux). Note that there are a number of possible variations of this technique such as running without flux (i.e., open-arc) and/or incorporating the flux as a powder into the feedstock powder mix. The samples were welded at various powder to wire feed ratios onto 572 Grade 50 steel and the 2:1 powder to wire feed ratio was used for further subsequent study. Single pass samples were used to show the effects of weld dilution and double pass samples were additionally welded to show the properties of the overlay where the dilution affect is small. After welding to form a continuous wear plate, samples were cut out using water jet cutting. The resulting samples were then ground flat using a high speed Diemaster grinder.

Rockwell C hardness testing was performed using a standard diamond indenter. Six hardness measurements were taken on each single pass and double pass samples and the results are shown in Tables 3 and 4 respectively. As shown, relatively high hardness was obtained in all of the resulting weld overlays. In the single pass overlays, hardness was found to vary from 69 to 73 Rc while in the double pass overlays, hardness was found to vary from 66 to 75 Rc. Note that the hardness of the weld overlays shown were in the as-solidified condition and achieved without the need for elevated temperature heat treatment.

TABLE 3

Single Pass Hardness (Rc) of SAW Weld Overlays

| Alloy | ALLOY 1 | ALLOY 2 | ALLOY 4 | ALLOY 5 | ALLOY 6 |
|---|---|---|---|---|---|
| point #1 | 68.3 | 66.3 | 65.0 | 67.2 | 66.6 |
| point #2 | 69.2 | 64.5 | 63.4 | 65.7 | 66.9 |
| point #3 | 69.2 | 67.3 | 63.6 | 65.6 | 66.4 |
| point #4 | 68.7 | 65.3 | 61.8 | 66.3 | 65.2 |
| point #5 | 68.6 | 65.8 | 62.1 | 67.1 | 66.8 |
| point #6 | 69.2 | 65.1 | 63.2 | 66.3 | 65.8 |
| Average | 68.9 | 65.7 | 63.2 | 66.4 | 66.3 |

TABLE 4

Double Pass Hardness of SAW Weld Overlays

| Alloy | ALLOY 1 | ALLOY 2 | ALLOY 4 | ALLOY 5 | ALLOY 6 |
|---|---|---|---|---|---|
| point #1 | 71.4 | 71.0 | 69.3 | 70.5 | 68.4 |
| point #2 | 71.3 | 69.9 | 69.1 | 70.0 | 68.0 |
| point #3 | 70.9 | 70.2 | 69.7 | 69.5 | 69.2 |
| point #4 | 69.7 | 70.9 | 68.8 | 70.0 | 68.2 |
| point #5 | 70.1 | 70.3 | 69.4 | 69.2 | 68.8 |
| point #6 | 70.1 | 72.0 | 68.4 | 69.9 | 68.6 |
| Average | 70.6 | 70.7 | 69.1 | 69.9 | 68.5 |

Weld Overlay Wear Resistance

The wear resistance of the weld overlays was measured on 1" by 3" coupons cut out of the single and double pass submerged arc overlay plates using the water jet. A Falex Friction & Wear Test Machine was used to measure the low stress abrasion resistance following the ASTM G65-04 standard using the Procedure A protocol which involves a test duration of 6000 cycles. In Table 5, the Procedure A mass loss is shown for the powder feedstock chemistries for both the single and double pass samples made using submerged arc welding. As shown, all samples exhibit relatively high wear resistance with single pass mass losses from 0.07 to 0.14 g and double pass mass losses from 0.07 to 0.15 g. Note that for each measurement after 6,000 cycles, the error bar range is found to be +/−0.02 g.

TABLE 5

Low Stress Abrasive Wear On Submerged Arc Overlays

| | ALLOY 1 | ALLOY 2 | ALLOY 4 | ALLOY 5 | ALLOY 6 |
|---|---|---|---|---|---|
| ASTMG65 Procedure A | Single Pass Welds - mass loss (g) | | | | |
| 1st 6,000 cycles | 0.12 | 0.07 | 0.13 | 0.14 | 0.13 |
| ASTMG65 Procedure A | Double Pass Welds - mass loss (g) | | | | |
| 1st 6,000 cycles | 0.11 | 0.07-0.12 | 0.13 | 0.15 | 0.13 |

Example #1

ALLOY 6 Submerged-Arc to GMAW Overlay

In this example the ALLOY 6 feedstock powder was submerged arc-welded using a 1.85 to 1 powder to wire feed ratio using a carbon electrode made up of EM12K. Concurrently, a metal powder cored wire was made into a ¹/₁₆" diameter wire using Alloy 6 feedstock powder blend and a 1006 steel strip. The resulting wire was welded onto a substrate using a conventional Gas Metal Arc Welding (GMAW) process. Note that since flux was put into the wire mixture during manufacturing, the welding could have also been done in the open-arc (i.e., no cover gas) condition with similar results. From the overlays produced both single and double pass samples were cut out using either water jet for submerged arc samples or wire electro discharge machining (EDM) for the GMAW samples.

To examine the ribbon structure, scanning electron microscopy (SEM) was done on the single and double pass samples of both the ALLOY 6 overlays produced by submerged arc and GMAW. Using wire, EDM samples of overlay were sectioned off and then mounted in a standard metallographic mount with hardened epoxy. The resulting metallographic mount was ground and polished using appropriate media following standard metallographic practices. The structure of the samples was observed using a Zeiss EVO-60 scanning electron microscope with an electron beam energy of 17.5 kV, a filament current of 2.4 A, and a spot size setting of 800.

Figure 2:
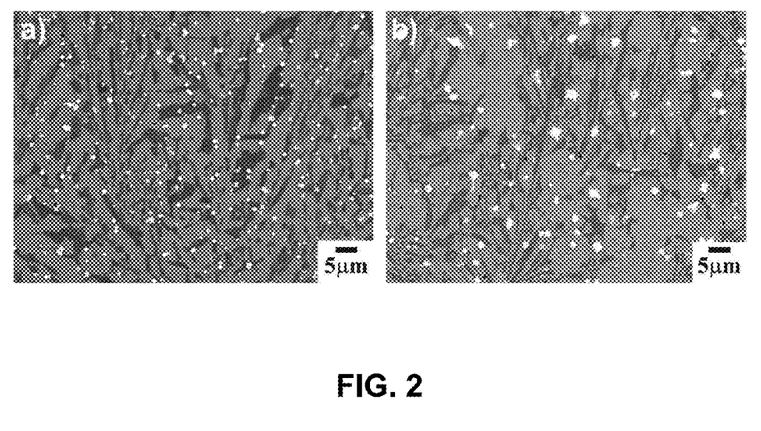
FIG. 2 illustrates backscattered electron micrographs of ALLOY 6 alloy; wherein a) illustrates single pass GMAW samples welded using 1/16" diameter wire and b) illustrates single pass submerged arc samples welded at a 1.85 to 1 powder to wire feed ratio.
Figure 3:
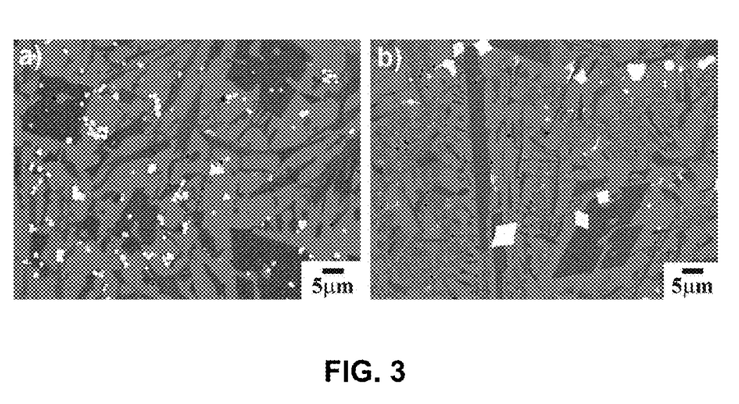
FIG. 3 illustrates backscattered electron micrographs of ALLOY 6 alloy; wherein a) illustrates double pass GMAW samples welded using 1/16" diameter wire and b) illustrates double pass submerged arc samples welded at a 1.85 to 1 powder to wire feed ratio.

In FIGS. 2 and 3, backscattered electron micrographs are shown of the ALLOY 6 GMAW and submerged arc overlays in both single and double pass samples, respectively. As shown, the metallurgical structures of both samples are very similar independent of welding technique. This illustrates that a cored wire approach using a plain carbon sheath in GMAW welding or a powder feed with a plain carbon solid wire in submerged-arc welding may result in similar structures and metallurgical behavior.

Example #2

ALLOY 2 Powder to Wire Feed Ratio

Using the ALLOY 2 feedstock powder listed in Table 1, a number of submerged arc-overlay samples were welded using the EM12K electrode at various powder to wire feed ratios including; 0.73 to 1, 1 to 1, 1.1 to 1, 1.2 to 1 and 1.25 to 1 onto 572 Grade 50 steel. Note that as the powder to wire feed ratio increases, the overlay deposit chemistry changes and increases in alloy content. Using water jet cutting, samples were removed from the overlay plates. The samples were surface ground using a Diemaster grinder to enable accurate crack counts, hardness, and wear measurements.

On the as-ground weld plates, the cross check cracking patterns (hairline cracks across the weld beads) in the submerged arc plates were revealed and could be counted. The lineal density of cracks in both the single and double pass samples was measured by counting the cross check intersections across a straight line drawn from edge to edge lengthwise and the results are tabulated in Table 6. The cross check density of the single pass overlays was found to be greater than that of the double pass overlays. The single pass overlays exhibited a linear crack from 7 to 12 cracks while the double pass overlays exhibited a linear crack density from 9 to 15 cracks.

TABLE 6

Number of Cracks as a Function of Powder to Wire Feed Ratio

| Powder to Wire Feed Ratio | Number of Cracks | |
| --- | --- | --- |
| | 1-pass | 2-pass |
| 0.73:1 | 7 | 9 |
| 1:1 | 9 | 14 |
| 1.1:1 | 12 | 14 |
| 1.2:1 | 10 | 13 |
| 1.25:1 | 8 | 15 |

Rockwell C scale hardness was taken on all single and double pass weld overlays after grinding. In Table 7, the average hardness after six individual measurements is shown as a function of powder to wire feed ratio. As shown all the deposits are relatively hard and the single pass hardness ranges from 67 to 71 Rc while the double pass hardness is found to vary from 69 to 72 Rc.

TABLE 7

Hardness as a Function of Powder to Wire Feed Ratio

| Powder to Wire Feed Ratio | Hardness (HRc) | |
| --- | --- | --- |
| | Single Pass | Double Pass |
| 0.73:1 | 67.0 | 69.8 |
| 1:1 | 68.1 | 69.5 |
| 1.1:1 | 70.2 | 70.7 |
| 1.2:1 | 69.1 | 71.6 |
| 1.25:1 | 70.9 | 69.7 |

The low stress abrasion resistance was measured in duplicate on the double pass submerged arc weld overlays using the ASTM G65-04 dry sand rubber wheel abrasion Procedure A test method. The resulting average mass loss values as a function of powder to wire feed ratio are shown in Table 8. The wear resistance was found to be relatively high with mass losses found to vary from 0.09 to 0.11 g.

TABLE 8

Low Stress Abrasion Resistance as a Function of Powder to Wire Feed Ratio

| Powder To Wire Feed Ratio | Double Pass Mass Loss (g) |
| --- | --- |
| 0.73:1 | 0.11 |
| 1:1 | 0.11 |
| 1.1:1 | 0.09 |
| 1.2:1 | 0.10 |
| 1.25:1 | 0.09 |

Example #3

ALLOY 2 Physical Metallurgy

Figure 4:
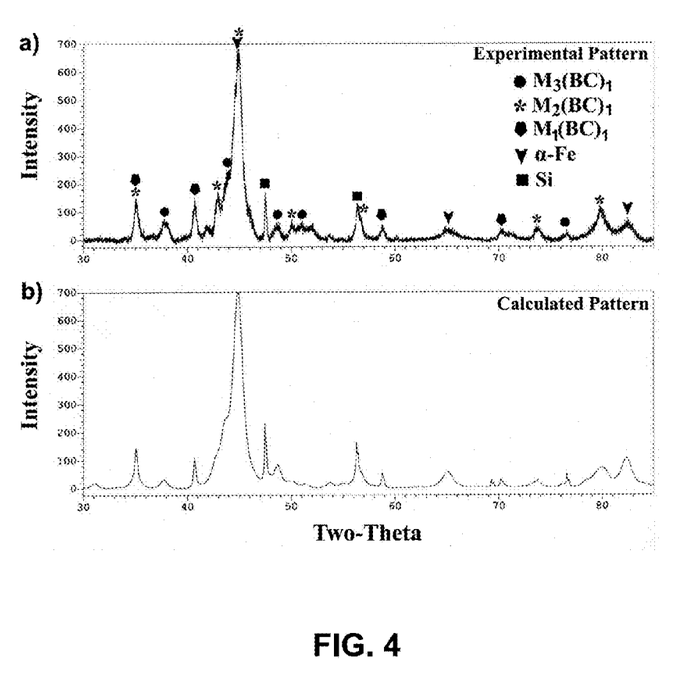
FIG. 4 illustrates X-ray diffraction scan of the ALLOY 2 weld overlay plate; wherein a) illustrates experimental pattern with phases and diffraction planes identified and b) illustrates calculated pattern from Rietveld refinement.

Using the ALLOY 2 feedstock powder listed in Table 1, submerged arc-overlay samples were welded using the EM12K electrode. Using water jet cutting, samples were removed from the overlay plates. On an ~1" square shaped double pass overlay, an X-ray scan was done using a PANalytical X'Pert MPD X-ray diffractometer using filtered Cu Kα radiation. The scan was done from 20 to 85° two-theta, at a step size of 0.01° and 1 s per step. Note that silicon was incorporated as a standard to allow effective Rietveld refinement of the lattice parameters using a Siroquant software package. In FIG. 4, an experimental and Rietveld refined pattern is shown of the ALLOY 2 overlay plate. As shown, a relatively accurate fit was found with the experimental data. The phases found, their indetiity and their lattice parameter are shown in Table 9. As indicated, the as-solidified microstructure is found to consist of multiple hard borocarbide phases [$M_1(BC)_1$, $M_2(BC)_1$, and $M_3(BC)_1$] in a ductile alpha-Fe matrix.

TABLE 9

Phase Identity & Structure For ALLOY 2 Submerged Arc Overlay

| Identified Phase | Crystal System | Space Group | Lattice Parameter (Å) |
|---|---|---|---|
| α-Fe | Cubic | Im-3m | a = 2.873 |
| M1(BC)1 | Cubic | Fm3m | a = 4.452 |
| M2(BC)1 | Tetragonal | I4/mcm | a = 5.147 |
|  |  |  | c = 4.244 |
| M3(BC)1 | Tetragonal | I-4 | a = 8.450 |
|  |  |  | c = 4.426 |

Figure 5:
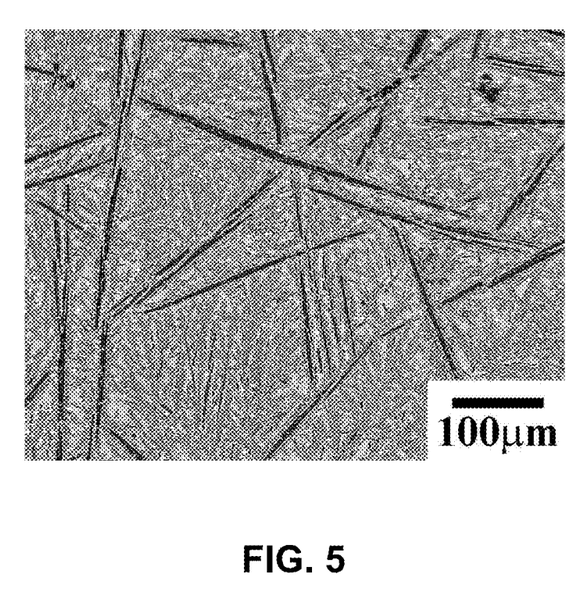
FIG. 5 illustrates backscattered electron micrograph at low magnification showing the as-solidified microstructure of the ALLOY 2 weld overlay plate.
Figure 6:
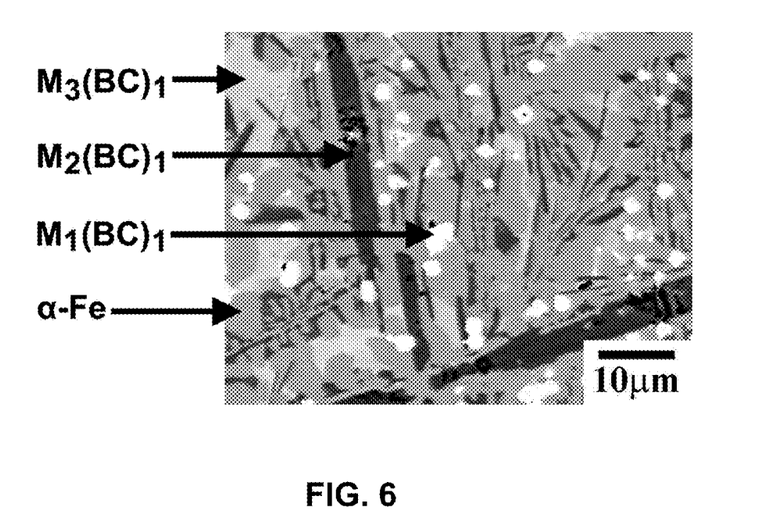
FIG. 6 illustrates backscattered electron micrograph showing the as-solidified structure of the ALLOY 2 overlay plate and with phases identified.

SEM studies on the two-pass ALLOY 2 submerged arc overlay were done using an EVO® MA10 manufactured by Carl Zeiss SMT using a tungsten filament. The SEM was equipped with a secondary electron (SE), a four quadrant backscattered electron detector, and an EDAX EDS Apollo 10 Silicon Drift Detector with a Genesis software package. In FIG. 5, a backscattered electron micrograph at low magnification is shown of the as-solidified microstructure of the ALLOY 2 weld overlay plate. In FIG. 6, a higher magnification backscattered electron micrograph is shown of the as-solidified structure of the ALLOY 2 overlay plate including the phases identified. Through studying the microstructure, it is apparent that the $M_2(BC)_1$ phase formed first in the liquid and is lathe shaped with widths of 1 to 4 microns and lengths that can be up to a 1 mm in size. The alpha iron phase is found to be the matrix and forms through a dendritic growth mode with spherical secondary dendrite arms broken off due to the circulating liquid currents from the welding process. The $M_1(BC)_1$ borocarbide phase is found to form next and is represented by small cubic phases from 0.2 to 2 microns in size. The last liquid to solidify forms the $M_3(BC)_1$ phase which is typically from 0.5 to 4 microns in size. The distribution of high volume fractions of fine, medium, and coarse borocarbide phases in a ductile matrix appears to be the reason for the relatively exceptional abrasion resistance found in this overlay material.

Figure 7:
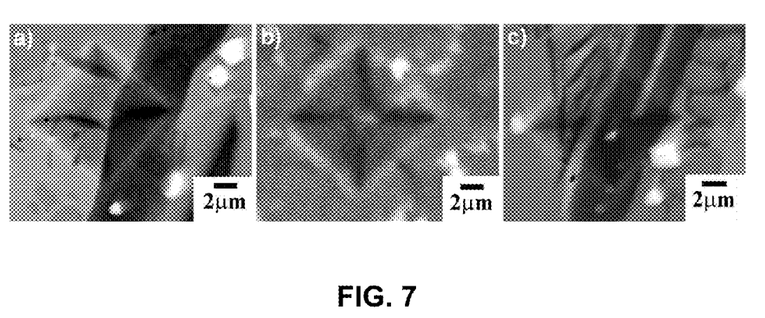
FIG. 7 illustrates backscattered electron micrographs of Vickers hardness indentations on random spots of the as-solidified ALLOY 2 weld overlay plate; wherein a) illustrates indentation with Vickers hardness of 1296 kg/mm2, b) illustrates indentation with Vickers hardness of 1187 kg/mm2, and c) illustrates indentation with Vickers hardness of 1148 kg/mm2.

Using wire EDM, a sample of ALLOY 2 submerged arc overlay were sectioned off and then mounted in a standard metallographic mount with hardened epoxy. The resulting metallographic mount was ground and polished using appropriate media following standard metallographic practices. Using a diamond indenter in a Vickers microhardness testing machine, a hardness array was put in a random fashion on the mounted cross section. The hardness indentations were then looked at in the SEM and three representative Vickers Hardness indentations are shown in FIG. 7 for indentations with high hardness's of 1296 kg/mm2, 1187 kg/mm2, and 1148 kg/mm2. As found in all of the samples and shown in the backscattered electron micrographs, no cracking was observed from the indentation. Thus, this result appears to demonstrate that the as-solidified weld overlay exhibits relatively significant inherent crack resistance and toughness. Note that cracks once formed from the hard borocarbide phases would be expected to be blunted and arrested by the ductile alpha-iron matrix.

Example #4

In the submerged arc welding process, the powder to wire feed ratio may be varied to achieve various target chemistries. For example, as the powder to wire feed ratio is reduced, then less powder may be used so the powder must be enriched further in alloying elements. Conversely, as the powder to wire feed ratio is increased, then more powder may be used so the alloying elements in the powder do not need to be enriched as much. This allows for variation in the powder chemistries presented earlier in Table 1.

As an example, consider two different powder make-ups for Alloy 2, which are Alloy 2-1 and Alloy 2-2 as shown in Table 10. Using an EM12K solid electrode (98.68 wt % Fe, 0.10 wt % C, 0.2 wt % Si, 1.02 wt % Mn), Alloy 2-1 was welded at a 0.73 powder to wire feed ratio using submerged arc welding. Using the same EM12K electrode, Alloy 2-2 was welded at a 1.75 powder to wire feed ratio using submerged arc welding. In both of the examples above, the target chemistry in the weld is the same and the weld properties may be relatively similar nonwithstanding the normal variations found in the overlay process. From the weld overlay deposits, the hardness and abrasion resistance was measured on prepared coupons in a methodology similar to what was presented earlier. In Table 11, the single pass hardness, double pass hardness, and ASTM G-65-04 mass loss is shown for both submerged arc samples. As shown the single and double pass hardness values are within 1 Rc point and the mass loss values are identical.

TABLE 10

Summary of Equivalent Weld Deposit Chemistries (Weight %)

| Alloy | Powder To Wire Feed Ratio | Fe | Mn | Cr | Mo | W | B | C | Si | Nb |
|---|---|---|---|---|---|---|---|---|---|---|
| ALLOY 2-1 | 0.73 | 23.4 | 0.1 | 44.7 | 7.5 | — | 11.4 | 3.2 | 0.7 | 9.0 |
| ALLOY 2-2 | 1.75 | 48.9 | 0.2 | 29.3 | 5.1 | — | 7.5 | 2.2 | 0.6 | 6.2 |

TABLE 11

Summary of Submerged Arc Powder Chemistries (Weight %)

| Alloy | Powder To Wire Feed Ratio | Single Pass Hardness (Rc) | Double Pass Hardness (Rc) | Double Pass Mass Loss (g) |
|---|---|---|---|---|
| ALLOY 2-1 | 0.73 | 67.0 | 69.8 | 0.11 |
| ALLOY 2-2 | 1.75 | 68.1 | 69.5 | 0.11 |

The foregoing description of several methods and embodiments has been presented for purposes of illustration. It is not intended to be exhaustive or to limit the specification to the precise steps and/or forms disclosed, and obviously many modifications and variations are possible in light of the above teaching.

What is claimed is:

1. A method of applying a metallic alloy overlay, comprising:
   providing an iron based feedstock powder including 24.3 wt % to 39.6 wt % iron and manganese, 23.1 wt % to 49.4 wt % chromium, 6.8 wt % to 12.8 wt % boron, 1.9 wt % to 3.6 wt % carbon, 0.5 to 0.9 wt % silicon, optionally 7.5 wt % to 7.6 wt % molybdenum, optionally 14.2 wt % tungsten, and 5.0 wt % to 12.8 wt % niobium;
   providing an electrode including at least 50% by weight iron;
   depositing a weld overlay with said feedstock powder and said electrode to create a metallic alloy exhibiting grain sizes in the range of 1,000 µm or less.

2. The method of claim 1, further comprising cooling said weld overlay at a rate of less than 100,000 K/s.

3. The method of claim 1, further comprising depositing multiple layers of said feedstock powder and said electrode.

4. The method of claim 1, wherein said feedstock powder has a particle size ranging from 1 μm to 500 μm.

5. The method of claim 1, wherein said metallic alloy has a peak glass to crystalline transition temperature from 500 to 750° C. as measured by differential thermal analysis at a rate of 10° C./min.

6. The method of claim 1, wherein said electrode is a cored wire.

7. The method of claim 1, wherein said metallic alloy exhibits a range of borocarbide phases.

8. The method of claim 7, wherein said borocarbide phases include $M_1(BC)_1$, $M_2(BC)_1$, $M_3(BC)_1$.

9. The method of claim 7, wherein said borocarbide phases exhibit a largest linear dimension of less than 1000 μm.

10. The method of claim 1, wherein the ratio of the feedstock powder to the electrode by weight is in the range of 0.2:1.0 to 5.0:1.0.

11. The method of claim 1, wherein said electrode comprises carbon present in the range of 0.05 to 0.15 wt %, manganese present in the range of 0.80 to 1.25 wt %, silicon present in the range of 0.45 to 0.70 wt %, phosphorous present at 0.03 wt % or less, copper present at 0.03 wt % or less, a total of any further components at 0.50 wt % or less and the balance iron.

12. The method of claim 1, wherein said metallic alloy exhibits a single pass Rockwell C hardness of greater than 55.

13. The method of claim 1, wherein said metallic alloy exhibits less than 0.20 grams mass loss when measured using ASTM G-65-04 procedure A for both single and double pass.

14. The method of claim 1, wherein said iron based feedstock powder includes 24.3 wt % to 39.5 wt % iron, 0.1 wt % manganese, 29.5 wt % to 49.4 wt % of chromium, 8.2 wt % to 12.8 wt % boron, 2.3 wt % to 3.6 wt % carbon, 0.6 wt % to 0.9 wt % silicon, optionally 7.5 wt % to 7.6 wt % Mo, optionally 14.2 wt % W, and 6.1 wt % to 12.8 wt % niobium.

* * * * *